M. C. OVERMAN.

VEHICLE TIRE.

APPLICATION FILED JUNE 3, 1913.

Reissued Oct. 7, 1913.

13,626.

2 SHEETS—SHEET 1.

Attest:

Eastwood Greene

Edw. Nelson

Inventor:

by Max Cyrus Overman

Edw. Scherr Jr. Atty

M. C. OVERMAN.

VEHICLE TIRE.

APPLICATION FILED JUNE 3, 1913.

Reissued Oct. 7, 1913.

13,626.

2 SHEETS—SHEET 2.

NEUTRAL POSITION

3/8" COMPRESSED

3/4" COMPRESSED

1" COMPRESSED

Attest:

Edgworth Greene

Edwd Wilson.

Inventor:

by Max Cyrus Overman

Geo. Scherr Jr. Atty

UNITED STATES PATENT OFFICE.

MAX CYRUS OVERMAN, OF NEW YORK, N. Y.

VEHICLE-TIRE.

13,626. Specification of Reissued Letters Patent. Reissued Oct. 7, 1913.

Original No. 1,057,083, dated March 25, 1913, Serial No. 658,459. Application for reissue filed June 3, 1913. Serial No. 771,554.

*To all whom it may concern:*

Be it known that I, MAX CYRUS OVERMAN, a citizen of the United States, residing at New York, in the county of New York and State of New York, have invented certain new and useful Improvements in Vehicle-Tires, of which the following is a specification.

My present invention consists of improvements on the tire of my co-pending application Serial No. 597,646 filed December 16, 1910.

To give increased lateral flexibility to the nose portion of the tire, I have so deepened the tread groove as to require transverse webs at intervals therein to prevent it from making the halves of the nose too flexible near the tread. I have further increased the lateral flexibility of the nose by providing frequently occurring transverse spaces 12 extending from the tread groove up under the side walls 8 of the tire. By these same spaces 12 combined with the tread groove, I have also made each half of the nose longitudinally flexible.

My present improvements combined with those of my aforesaid co-pending application result in a tire wherein I control the flange-free side walls to make them do their work as far as possible by endwise, that is, vertical compressions with prevention of unnecessary bending; and when it comes to the lateral and longitudinal bending which the tire in action is compelled to do, I control it also by distributing said bending to every part of the side walls and the halves of the nose of the tire, and make it occur on long non-abruptly curved lines from rim to tread as distinguished from permitting said bending to be uncontrolled and to concentrate at isolated points in the side walls or the nose of the tire, or both, and on such abrupt or deformed lines that the tire in action tends to overheat and break.

Figure 1:
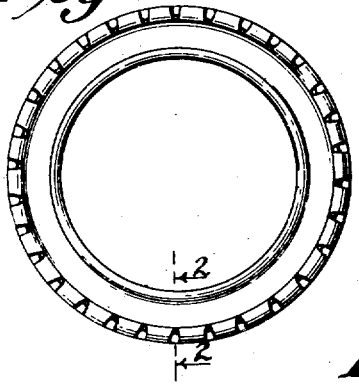
Figure 2:
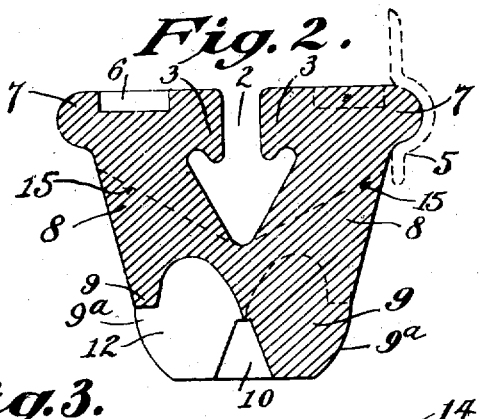

The advantage of my present improvements is marked, for, whereas the specific tire shown in Figure 1 in my aforesaid co-pending application tended after long usage to overheat and break along lines similar to those designated 15 in Fig. 2 of my present application, my present improvements prevent this and greatly extend the life of the tire. These and other features and advantages of my improvements will be understood by those skilled in the art from the following description in connection with the drawings, wherein only one specific embodiment of my invention is attempted to be shown.

Figure 3:
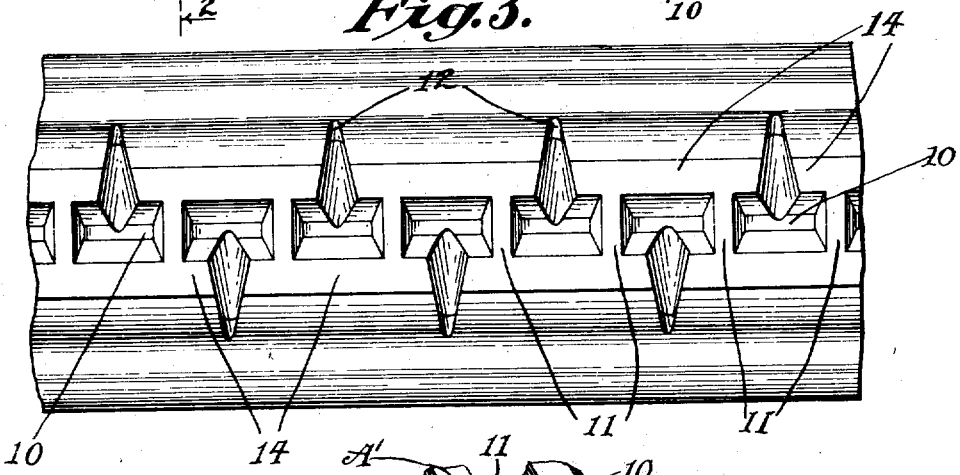
Figure 4:
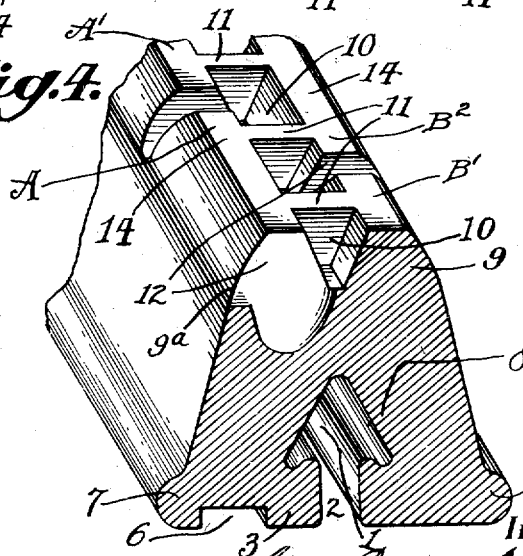
Figure 5:
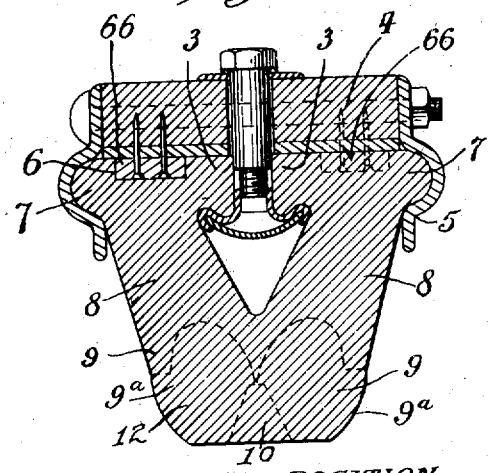
Figure 6:
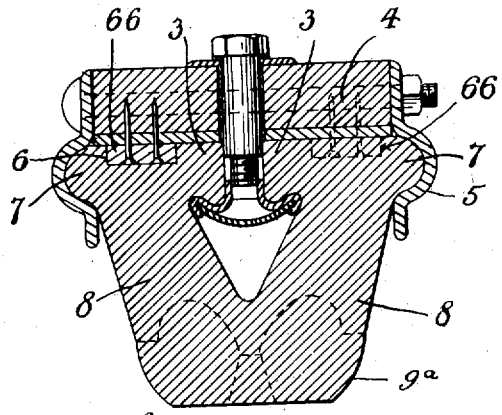
Figure 7:
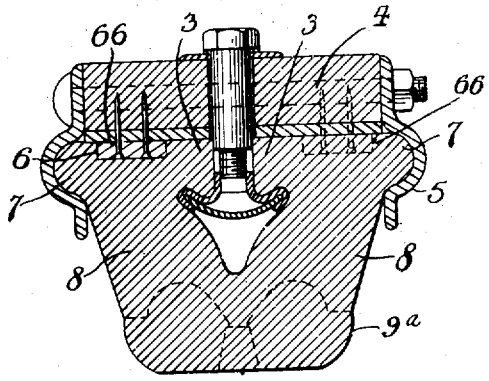
Figure 8:
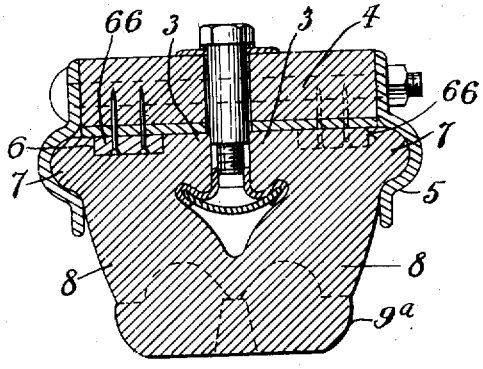

Fig. 1 is a side elevation of a complete tire within my invention; Fig. 2 is an enlarged transverse section on the line 2—2 in Fig. 1 looking in the direction of the arrow, and is much less than one-half the natural size of a tire suitable for an average weight automobile, said tire, actual size, being about five inches deep between tread and rim; Fig. 3 is a view looking down upon the tread of a fragment of the same tire; Fig. 4 is a perspective view of a fragment of the same tire; Fig. 5 is a transverse sectional view of the tire in a neutral or unloaded condition clamped to the felly, and Figs. 6, 7 and 8 show the same tire under the various extents of vertical compression indicated in the respective figures.

I will now describe the tire and devices of the drawings. The words "under" and "over" and similar expressions refer to the tire when positioned as in Fig. 2.

7 is the flange-engaged base portion of the tire, 8 the flange-free, upright, steeply converging, straight as distinguished from bowed, thick side walls inclosing the V-shaped longitudinal opening 1 between them and connecting the aforesaid base portion with the deep nose portion 9 which extends across the apex of the tire opening and under the side walls 8, and whose bottom is the tread of the tire delivering the vertical thrusts from the tread up under the walls 8, so that the halves of the nose firmly support and uphold the aforesaid side walls of the tire. The base portion of the tire overhangs the top of the V-shaped opening and is there longitudinally divided so as to provide the clamping portions 3 for engagement by the clamping means, all substantially as set forth in my aforesaid co-pending application Serial No. 597,646.

4 is the rim or felly to whose sides are bolted the annular converging flanges 5. In each half of the base of the tire over the side walls 8 is a longitudinal series of rectangular sockets 6, the sockets of the two series being staggered relative to each other. These sockets receive into them correspondingly positioned rectangular projections 66 on the felly. By this construction the tire is not only well secured to the wheel as set forth in my co-pending application Serial No. 649,952, filed September 13, 1911, covering this feature, but the drive is delivered by the blocks 66 directly over and to the legs of the tire, comprising the base portions of the tire, the flange-free side walls and the respective halves of the nose.

Like the tire of my application Serial No. 597,646, the nose of my present tire has a deep longitudinal groove 10 extending up into it from the tread under the apex of the V-shaped opening 1, but I have here made it so much deeper that I have been obliged to provide at intervals transverse webs 11 connecting the sides of the groove to prevent its deepness from making the halves of the nose too flexible near the tread.

The drawings show the groove 10 extending from the tread about one-half the distance to the apex of the opening 1 and while it can be extended deeper than this, there is obviously a limit to the lateral flexibility obtainable in this way. But I secure still further lateral flexibility by means of the transverse spaces 12 which extend at intervals from the tread groove through each half of the nose toward its sides, which these spaces preferably open through or penetrate as shown. By frequently interrupting the length of each half of the nose, these spaces 12 convert each of said halves from a solid wall which is laterally unyielding except as a whole, into a plurality of spaced apart portions 14 which are individually yielding and therefore make each half of the nose as a whole much more freely flexible in lateral directions. Further, these spaces 12 are adapted to be extended, as shown, up under the side walls 8 so as to give a deeper flexibility to the nose than is attainable by the tread groove alone. Preferably, the transverse spaces 12 that extend from one side of the tread groove alternate with those extending from the other side as shown in the drawings, which further show the individual webs 11 located between consecutive spaces 12. Thus, the longitudinal groove and the transverse spaces combine to give each half of the nose a well distributed lateral flexibility, which is in natural continuation of the lateral flexibility of the side walls 8, so that the legs of the tire are compelled to do their lateral bending work on long easy lines which are not destructive thereto. Similarly, the tread groove and the spaces 12 combine to give very necessary longitudinal flexibility to each half of the nose of the tire in natural continuation of the longitudinal flexibility of the side walls 8, so that the legs of the tire are likewise compelled to do their longitudinal bending work on long easy lines which are not destructive thereto.

The lateral flexibility comes into play as the car sways or swerves or the halves of the tread ride unevenly on the roadway, etc. The longitudinal flexibility comes into play as the car starts and stops or changes speeds or encounters obstacles, etc. Described in other language, the tread groove and the transverse spaces constitute portions removed from the nose extending deeply up into it from the tread which weaken it under the longitudinal opening and give the nose lateral flexibility under the side walls of the tire, said removed portions further extending up under said side walls in the form of frequently occurring transverse spaces which give it longitudinal as well as increased lateral flexibility.

It should be noted that the halves of the nose under the side walls must not be too flexible either laterally or longitudinally, so as to distort or buckle or perhaps collapse under the load, any more than too inflexible, since in both cases the tendency is to isolate the bending points of the legs of the tire as well as to make the bends too abrupt or distorted. It has already been explained how the transverse webs 11 prevent the deep tread groove from making the two halves of the nose of the tire too flexible near the tread. Similarly, to prevent the transverse spaces 12 from making the halves of the nose too flexible longitudinally, I prefer to let them extend through the sides of the nose only toward the tread and not at the closed ends or tops of said spaces.

Figs. 5 to 8 inclusive show a section of the tire of my present invention first at neutral or no compression, and then at the increasing extents of vertical compression indicated under the respective figures, and they illustrate how my present improvements, while contributing their own marked advantages, nevertheless have not changed those characteristics that are so advantageous in the tire of my co-pending application Serial No. 597,646.

In the drawings, the profile lines $9^a$ of the nose are seen to round outwardly slightly from the outer sides of the walls 8 and then inwardly to the tread. This does not impair the proper working of the tire as the compression Figs. 5 to 8 show, and has the advantage over the sharp-cornered tire of my application 597,646, in making it easier for the tire to get in and out of car tracks and ruts.

The continuous flexibility both longitudinal and lateral of the legs of my tire from rim to tread has a further advantage in that the bending of said legs absorbs the force of sudden starts, stops, changes of speed, swerving, etc., and, in general, prevents it from being delivered to the tread to a sufficient extent to cause the tire and vehicle to slide or skid. Reversely, the legs of the tire by their described flexibility are of course equally effective in the absorption of shocks coming from the tread upwardly toward the rim due to encountering road-obstacles, etc.

The expression "bending collapse" in the claims means not only an actual collapse but also the tendency toward collapse showing in a buckling or like distortion of the supporting parts of the tire.

What I claim is:

1. A new article of manufacture, a cushion tire which is hollow by means of a longitudinal opening having a V-shaped transverse section whose base is at the flange-engaged portion of the tire and whose apex extends toward the tread well below said flange-engaged portion, said tire having thick upright side walls at the sides of said opening and a deep nose portion extending across the apex of said opening and across the lower ends of said walls, said nose portion having a bottom with a wide ground-contact delivering the vertical thrusts from the tread well under said side walls, said nose having portions removed therefrom extending deeply up into it from the tread which weaken it under the apex portion of the V-shaped opening and give it lateral flexibility under the side walls of the tire, said removed portions further extending up under said side walls in the form of frequently occurring transverse spaces which give the nose longitudinal as well as increased lateral flexibility.

2. A new article of manufacture, a cushion tire which is hollow by means of a longitudinal opening having a V-shaped transverse section whose base is at the flange-engaged portion of the tire and whose apex extends toward the tread well below said flange-engaged portion, said tire having thick upright side walls at the sides of said opening and a deep nose portion extending across the apex of said opening and across the lower ends of said walls, said nose portion having a bottom with a wide ground-contact delivering the vertical thrusts from the tread well under said side walls, said nose portion having a deep longitudinal groove extending up into it from the tread under the apex portion of the longitudinal opening, the sides of said groove being connected at intervals by transverse webs and each half of said nose portion having frequently occurring transverse spaces which extend up under the side walls of the tire from the tread and the sides of the tread groove.

3. A new article of manufacture, a cushion tire which is hollow by means of a longitudinal opening having a V-shaped transverse section whose base is at the flange-engaged portion of the tire and whose apex extends toward the tread well below said flange-engaged portion, said tire having thick upright side walls at the sides of said opening and a deep nose portion extending across the apex of said opening and across the lower ends of said walls, said nose portion having a bottom with a wide ground-contact delivering the vertical thrusts from the tread well under said side walls, said nose portion having a deep longitudinal groove extending up into it from the tread under the apex portion of the longitudinal opening, the sides of said groove being connected at intervals by transverse webs and each half of said nose portion having frequently occurring transverse spaces which extend up under the side walls of the tire from the tread and the sides of the tread groove, the spaces in one half of the nose being staggered relative to the spaces in the other half, and the aforesaid webs being located between consecutive spaces.

4. A hollow cushion tire comprising the combination of flange-free, thick, substantially straight side walls which steeply converge toward the tread inclosing between them the longitudinally extending tire-hollow of a small triangular cross section, said combination further comprising a wide, deep, substantial nose portion extending across the hollow of the tire in firm supporting ground-contact under said walls, the legs of said tire from tread to rim supporting the load by their vertical compression with accompanying thickening but without bending collapse, and the outline of the compressed tire remaining substantially like the uncompressed tire, said nose being longitudinally deeply weakened providing laterally flexible halves under said walls, and said halves being transversely deeply weakened, making each of them longitudinally flexible.

5. A hollow cushion tire comprising the combination of flange-free walls containing the hollow of the tire between them and supporting the load by their vertical compression with accompanying thickening but without bending collapse, and a wide, deep, substantial nose portion extending horizontally across the hollow of the tire in firm supporting ground-contact under said walls, said nose being longitudinally deeply weakened providing laterally flexible halves under said walls, and each half being transversely deeply weakened making said halves longitudinally flexible, said halves also, like the walls, supporting the load by their vertical compression with accompanying thickening but without bending collapse.

6. A hollow cushion tire comprising the combination of flange-free walls containing the hollow of the tire between them and supporting the load by their vertical compression with accompanying thickening but without bending collapse, and a wide, deep, substantial nose portion extending horizontally across the hollow of the tire in firm supporting ground-contact under said walls, said nose being longitudinally deeply weakened providing laterally flexible halves under said walls, and each half being transversely deeply weakened making said halves longitudinally flexible, said halves also, like the walls, supporting the load by their vertical compression with accompanying thickening but without bending collapse, said transverse weakenings extending up more deeply than the longitudinal weakening and substantially to the lower ends of the walls of the tire.

7. A hollow cushion tire comprising the combination of flange-free walls containing the hollow of the tire between them and supporting the load by their vertical compression with accompanying thickening but without bending collapse, and a wide, deep, substantial nose portion extending horizontally across the hollow of the tire in firm supporting ground-contact under said walls, said nose being longitudinally deeply weakened providing laterally flexible halves under said walls, and each half being transversely deeply weakened making said halves longitudinally flexible, said halves also, like the walls, supporting the load by their vertical compression with accompanying thickening but without bending collapse, said transverse weakenings extending up more deeply than the longitudinal weakening and substantially to the lower ends of the walls of the tire, said transverse weakenings extending through the sides of the nose portion but only do so near the tread.

8. In a rubber vehicle tire, a deep nose portion possessing deep lateral and longitudinal flexibility by having frequent deep upright alternating spaces extending into it from the sides and tread to the middle of the nose where said spaces widen toward each other, said widened portions extending in end to end arrangement longitudinally around the tire; and being separated by transversely extending tread webs.

9. In a rubber vehicle tire, a deep nose portion possessing deep lateral and longitudinal flexibility by having frequent deep upright alternating spaces extending into it from the sides and tread to the middle of the nose where said spaces widen toward each other, said widened portions extending in end to end arrangement longitudinally around the tire; and being separated by transversely extending tread webs, said spaces being extra deep under the side portions as distinguished from the middle portion of the tire.

In testimony whereof I affix my signature in the presence of two witnesses.

MAX CYRUS OVERMAN.

Witnesses:

E. W. Scherr, Jr.,

Charles D. Shrady.